United States Patent
Poon et al.

(10) Patent No.: US 7,002,933 B1
(45) Date of Patent: Feb. 21, 2006

(54) WIRELESS MOBILE NETWORK WITH AN ADAPTIVE LOCALLY LINKED MOBILE NETWORK FOR LOCALLY ROUTING MULTIMEDIA CONTENT

(75) Inventors: Tommy C. Poon, Murray Hill, NJ (US); Jay Bao, Bridgewater, NJ (US); Philip Orlik, Eatontown, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 818 days.

(21) Appl. No.: 09/684,407

(22) Filed: Oct. 6, 2000

(51) Int. Cl.
*H04B 7/14* (2006.01)
(52) U.S. Cl. .................... 370/315; 370/328; 455/15
(58) Field of Classification Search ............... 455/449, 455/15, 16, 426, 426.2; 370/337, 338, 315, 370/349, 342, 328, 401
See application file for complete search history.

(56) References Cited

U.S. PATENT DOCUMENTS

| | | | | |
|---|---|---|---|---|
| 4,794,649 A | * | 12/1988 | Fujiwara ..................... | 455/9 |
| 5,898,679 A | * | 4/1999 | Brederveld et al. ......... | 370/315 |
| 5,903,618 A | * | 5/1999 | Miyake et al. .............. | 375/356 |
| 6,028,853 A | * | 2/2000 | Haartsen ..................... | 370/338 |
| 6,298,051 B1 | * | 10/2001 | Odenwalder et al. ....... | 370/342 |
| 6,480,472 B1 | * | 11/2002 | Jou et al. .................... | 370/252 |
| 6,671,525 B1 | * | 12/2003 | Allen et al. ................. | 455/574 |

* cited by examiner

*Primary Examiner*—Chau Nguyen
*Assistant Examiner*—Ian N. Moore
(74) *Attorney, Agent, or Firm*—Dirk Brinkman; Andrew J. Curtin

(57) ABSTRACT

A wireless mobile communication network allows mobile, nodes, such as cellular telephone, and other types of mobile transceivers, to communicate with a fixed base station and directly with one another. This mobile to mobile communication capability is exploited through the formation of a local link where nodes with excess processing and bandwidth capacity forward messages at the request of the base station. The formation of the local link is adaptive and does not require a central controller. The wireless mobile network includes a base station and mobile nodes. Nodes are configured as a major nodes when they communicate information directly with the base station via a network link. Nodes are configured as minor nodes when they communicate the information indirectly with the base station via a direct local link with one of the major nodes to form a locally linked mobile network within the wireless mobile communications network. Each mobile node includes a header detector, coupled to a receiver and a decoder of the node to detect a header in a frame used to communicate the information, and a message processor, coupled to the header detector and a transmitter, to route the frame to the minor node.

31 Claims, 4 Drawing Sheets

WIRELESS MOBILE NETWORK WITH AN ADAPTIVE LOCALLY LINKED MOBILE NETWORK FOR LOCALLY ROUTING MULTIMEDIA CONTENT

FIELD OF THE INVENTION

This invention relates generally to wireless communications networks, and more particularly, to mobile networks where bandwidth resources are shared among multiple users.

BACKGROUND OF THE INVENTION

In a wireless communication network designed for multimedia services, such as $3^{rd}$ generation wireless network, inter-symbol interference (ISI) caused by multipath fading, and multiple access interference (MAI) due to interference between codes of multiple mobile users are two major factors that limit the performance of the network. Increased mobility of users in wireless communication networks often results in fast fading and the resulting Doppler spread substantially degrades the receivers' performance.

Inter-symbol mitigation techniques such as orthogonal variable rate spreading and RAKE receivers have been developed. To combat the effect of MAI, many multi-user detectors have been proposed. On the other hand, conditions of the channel link can vary significantly even within the same cell or sector. Although it is possible at the network level to dynamically assign bandwidth resources based on a users' need, the deliverable data rate is ultimately limited by the quality of the channel link. However, at any given time, within a given cell, there may be other users who are in standby mode, or are operating at less than full capacity of the bandwidth.

It is desired to better share network resources among multiple users in a mobile communications network to provide improved performance and throughput.

SUMMARY OF THE INVENTION

The invention provides radio link resource sharing between wireless cell phones and other mobile radio devices in a mobile communications network. The invention enables the routing of multimedia information (data, video, and voice) from one mobile device to another mobile device, when a device is not active, or when the device is active but has bandwidth to spare. The invention significantly increases the overall efficiency and quality of service of the mobile network.

More particularly, the invention provides a method and network to forward high data rate information to nodes that otherwise could not receive such data directly from the base station. The invention may also be used as a means of range extension so that a base station may communicate (indirectly through an intermediate node) with nodes that would otherwise be unreachable. Thirdly, the proposed invention can be employed to efficiently distribute multicast data throughout a wireless communication system.

A wireless mobile communication network allows mobile nodes, such as cellular telephone, and other types of mobile transceivers, to communicate with a fixed base station and directly with one another. This mobile to mobile communication capability is exploited through the formation of a local link where nodes with excess processing and bandwidth capacity forward messages at the request of the base station. The formation of the local link is adaptive and does not require a central controller. The wireless mobile network includes a base station and mobile nodes. Nodes are configured as major nodes when they communicate information directly with the base station via a network link. Nodes are configured as minor nodes when they communicate the information indirectly with the base station via a direct local link with one of the major nodes to form a locally linked mobile network within the wireless mobile communications network. Each mobile node includes a header detector, coupled to a receiver and a decoder of the node to detect a header in a frame used to communicate the information, and a message processor, coupled to the header detector and a transmitter, to route the frame to the minor node.

Locally Linked Mobile Network

Figure 1:
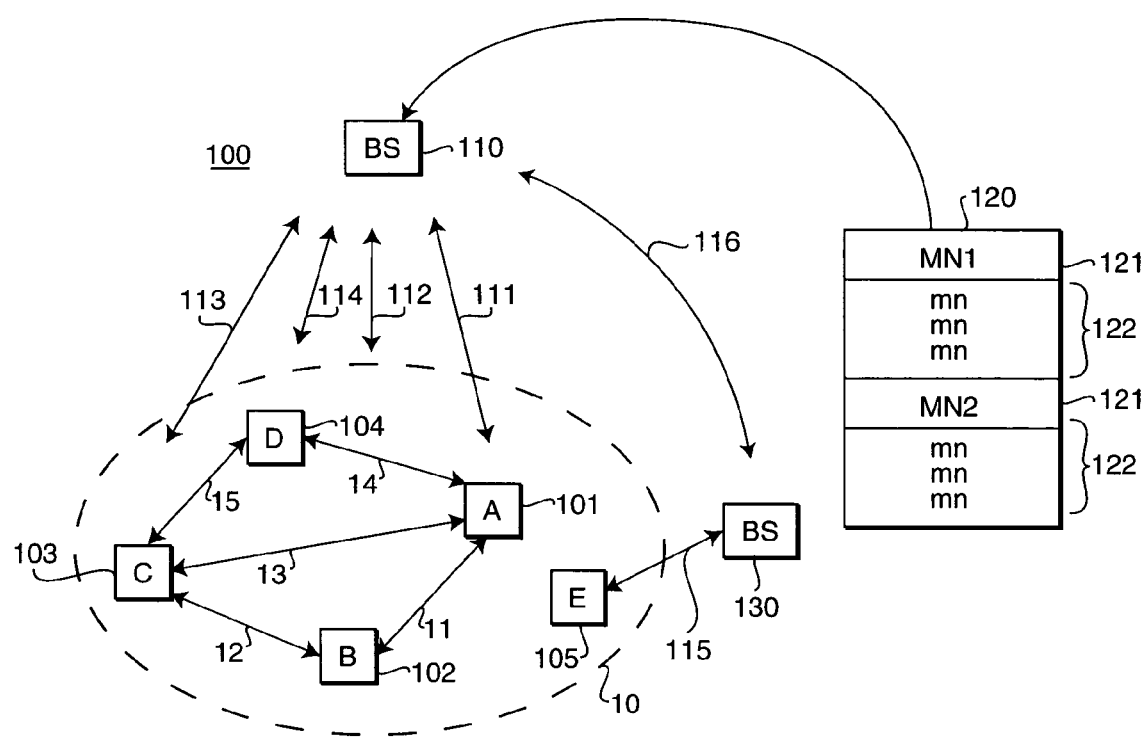
FIG. 1 is block diagram of a mobile communications network with a locally linked mobile network according to the invention.

FIG. 1 shows a mobile communications network 100 with a locally linked mobile network 10 according to the invention. The network 100 includes mobile nodes A 101, B 102, C 103, D 104, and E 105. The nodes can be cellular telephones, or other similar mobile radio transceivers, such as hand held digital personal assistants (PDA) with wireless capabilities, pagers and wireless e-mail devices. In a conventional wireless network, such as IS-95 CDMA, the mobile nodes 101–105 communicate only with each other via basestation base stations (BS) 110 and 130 over network links 111–115, respectively. The base stations communicate with each other via link 116.

The quality of the network links 111–115 depends on the location of the nodes and the sensitivity of the receivers. During operation of the mobile network 100, the nodes 101–105 can either be in active mode or standby mode. A node is active when it is sending and receiving information. The information is communicated as messages formatted into packets or frames. A node is in standby mode, when it is turned on, but not otherwise communicating information, other than control signal to the base station to indicate its presence in the network.

The amount of bandwidth used on each of the network links 111–114 depends on the operation mode and the type of information communicated on the links. For example, data and video services typically require a higher data rate than voice services.

At certain times, mobile node C 103 needs a high data rate, for example, when the user of node C 103 is accessing multimedia on the Internet. However, it is possible that the desired data rate cannot be provided due to a less than optimal conditions on the network link 113 between node C and the base station 110. Multipath fading and multiple access interference, as described above, can cause degradation on the link.

However, node A 101 is in standby mode, or active at a low data rate, and has a high quality network link 111 with the base station. In addition, node A is positioned near node C. In this case, the invention provides means that allows node C 103 to communicate with the base station 110 via a local link 13 and node A 101. In other words, the base station sends the high data rate information to node A, and node A forwards the information to node C over the local link 13. That is, node A communicates with node C without using the base station as is normally done in a mobile communications network. When the mobile network is operating in this manner, mobile node A is configured as a major node, and node C is configured a minor node, and the major node is operating in routing mode. In this case, the nodes 101–104 of the mobile network include one or more local links 11–15 to form the locally linked mobile network 10.

Basic Structure of a Mobile Node

Figure 2:
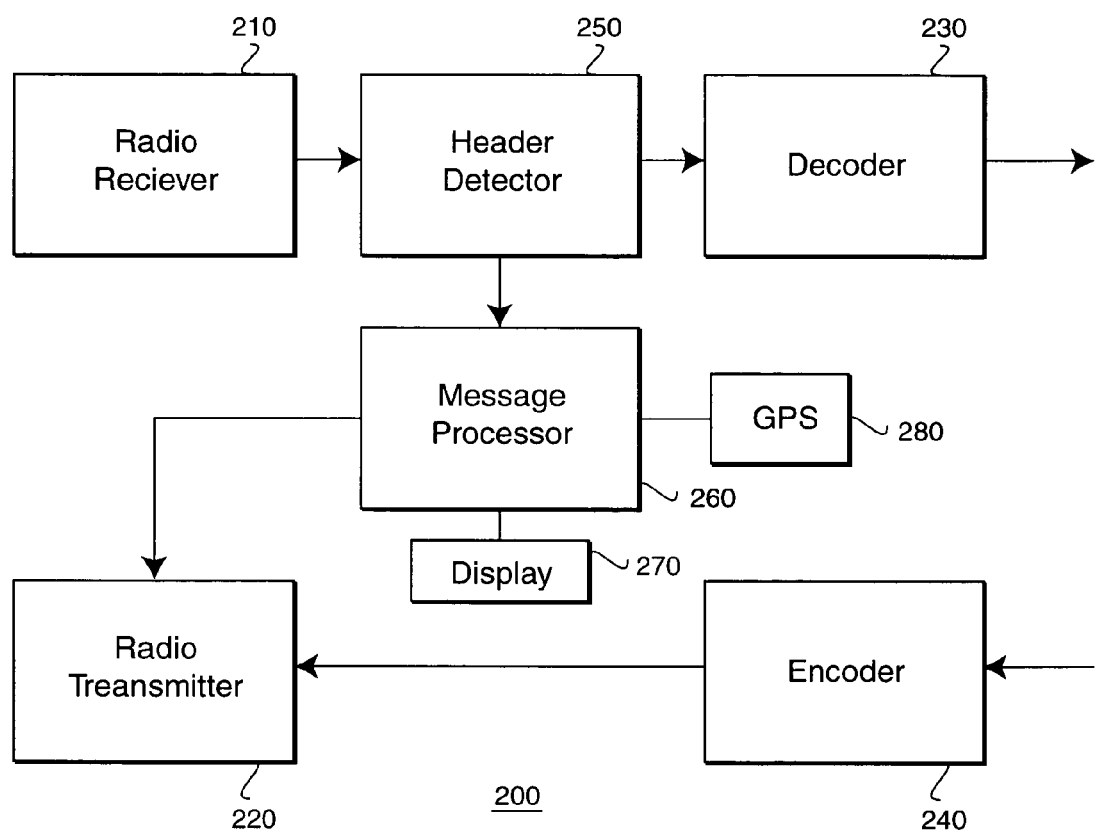
FIG. 2 is a block diagram of a mobile transceiver according to the invention.

FIG. 2 shows the components of a mobile node 200 according to the invention. It should be noted that all the mobile nodes in the system should have the basic block diagram structure as shown in FIG. 2. The node 200 includes a receiver 210, a transmitter 220, a decoder 230, and an encoder 240. In addition, the node 200 includes a header detector 250 and a node-to-node message processor 260. The receiver and transmitter are coupled to an antenna is known in the art.

During operation, the header detector detects received frames or packets that are destined for the locally linked network 10 of FIG. 1. Each frame that is destined for the local link has a prepended header 401 described in further detail below, see FIG. 4.

The header is generated by using orthogonal Walsh codes. The preferred implementation will use an 8-bit Walsh code word, this allows up to eight orthogonal header codes. Each Walsh code word indicates a unique local link message type. The message types used by the present invention are: "forward," "destination," "routing," and "receive." Each message type is explained in detail below. The header detector 250 correlates the header 401 with the known Walsh codes corresponding to the message types. The results of correlation indicate whether or not the received frame is to be passed to the message processor 260 for further processing.

The base station and the nodes operates synchronously for the header detector 250 to operate correctly. This system synchronization can be achieved through the use of a timing signal received by an optional global positioning system receiver (GPS) 280.

If the header detector 250 is placed after the decoder 230, then the nodes can operate asynchronously. In this case, the entire frame, i.e., header and user data is decoded and the header portion of the frame can be correlated with the known Walsh codes. In order to provide security in this case, the portion of the frame containing user data can be encrypted a pseudo random number (PN) sequence.

As an example of the invention's operation, consider a frame which is to be routed to a minor node, for example, node C 103 of FIG. 1. The frame to be forwarded is identified with a "forward" header of the frame. At the major node of the local link, node A 101, the forward header is detected, then the frame is passed to the message processor 260. The message processor 260 identifies the minor node 103, the message processor replaces the "forward" header code word with the "receive" header code word and passes the frame to the transmitter 220 so that the frame can be routed to the minor node 103. In essence, the message processor is responsible for reformatting the frames for rerouting.

While the major node 101 is in routing mode, a warning message can be generated for a display 270 of the major node that local routing is in progress.

At node C 103, the receive header code word is detected and the frame is passed to its message processor where local link header is removed and the user data is extracted. When a node is configured as a major node for a local link, the message processor block 260 is responsible for updating/modifying the local link header and associated fields. When a node is a minor node, all that is required is the detection of a receive header and the subsequent extraction of the user data.

Traffic Monitoring and Control

The routing of information of the locally linked mobile network 10 of the mobile communications network 100 is monitored at the basestation 110. If a new request for local routing occurs, while the major node is already routing, or if the required bandwidth exceeds the capacity of the major node, a new route can be established by directing messages to another major node.

Setup and Adaptive Configuration of Locally Linked mobile Network

The size and shape of the locally linked mobile network is adaptively adjusted by the basestation 110 depending on need, traffic type, link quality, coverage, utilized bandwidth, and mobility. The user nodes 101–105 can monitor the quality of the links 111–1145 and other network mobility characteristics and conditions to determine if they can be configured as major nodes for the locally linked mobile network. For example, if the node 200 includes the GPS receiver 280, the node can estimate position, speed, and bearing. Thus, the nodes can use channel quality and mobility characteristics to determine suitability as being configured as major nodes.

Specifically, if the channel quality and mobility characteristics are within predetermined thresholds, a node broadcasts a routing message proposing that it can be configured to operate as a major node. This message is identified by a "routing" Walsh code word header described in greater detail below. The routing message can include available capacity/bandwidth and other relevant information. The message can be received and decoded by the base station 110. Other proximate nodes can also receive and decode this message.

These nodes, in response to receiving the routing message, can then broadcast a "destination" message to the proposed major node and the base station, indicating that they are configured as minor nodes to receive messages from the proposed major node. With this scheme, the base station can form a model of the locally linked mobile network 10.

As shown in FIG. 1, the base station 110 can maintain a configuration list 120 in a memory. The configuration list associates the major node (MN) 121 with the minor nodes (mn) 122 that have joined the major node's local link. As needed, the base station can then formulate frames with the appropriate forward headers to route to minor nodes via the local links.

Inter-Cell Handoff

In the locally linked mobile network 10, node D 105 is serviced by another basestation 130 via link 115. For example, when a major node crosses a cell boundary, its local link becomes unusable. In this case, the base station needs to use an alternate major node to reach the associated minor nodes. Because a minor node can associate itself with multiple major nodes A new major node can be selected by the base station to serve as the relay for the minor node whose major node left the cell. This process is transparent to the user to which the data is designated.

Scalable Routing

The locally linked mobile network 10 can also be configured so that message pass through more than one major nodes on the way to a destination node. In other words, major nodes can communicate with each other. This makes it possible to route a large message via multiple major nodes. For example, in the case of a video conferencing service, it is possible to distribute the video data among several major nodes using several local links. In this case, the locally links network is operating in multicast mode.

Figure 3:
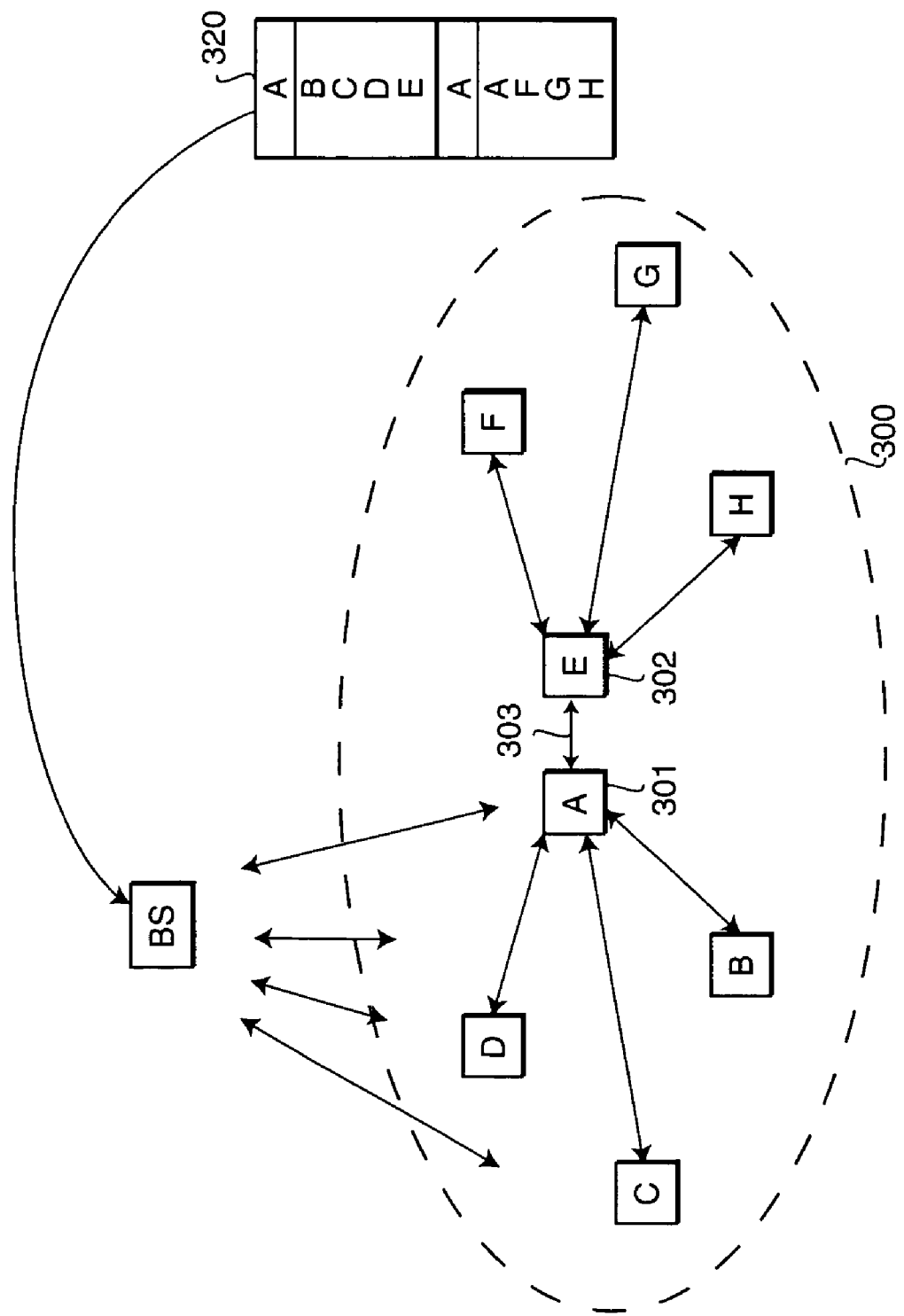
FIG. 3 is a block diagram of multicast information distribution.

As shown in FIG. 3, a locally linked mobile network 300 includes major nodes A 301 and E 302. During the configuration of the locally linked network, nodes B, C, D, E were associated with node A, and nodes A, F, G, H were associated with node E as indicated in the configuration list 320. Because major nodes A and E are associated with each other, messages can pass to minor nodes via local link 303. The base station can also distribute information to minor nodes by having either node A or E act as the routing node.

Dynamic Routing

In addition to searching for nearest neighbor, more sophisticated algorithms for determining the best route can be derived. This may results in cascading of several nodes to achieve best quality of service.

Frame Format

Figure 4:
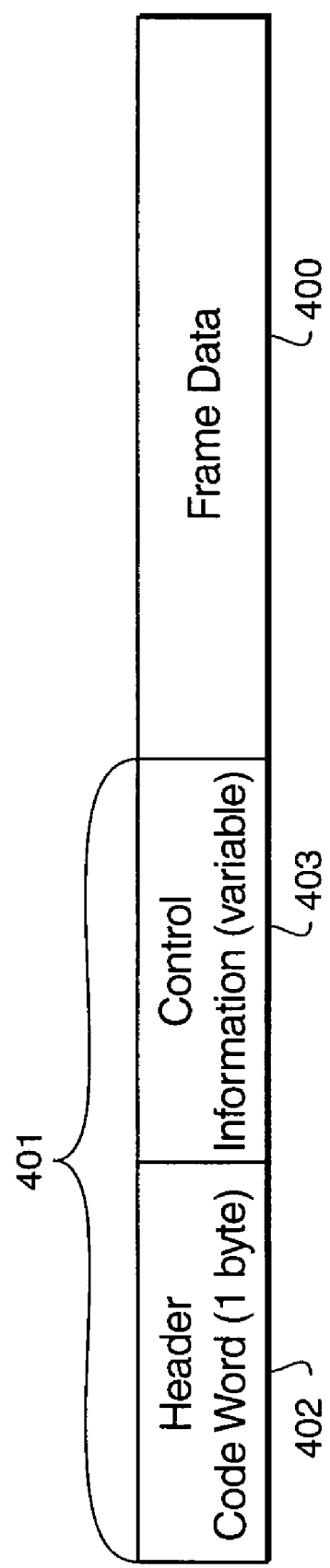
FIG. 4 is a block diagram of a frame according to the invention.

FIG. 4 shows a frame 400. The frame can include the header 401 to indicate that the frame is a forward, routing, or destination frame as described above. The header 401 is composed of multiple parts depending on the type of local link message. Generally the first byte of header is the Walsh code word 402 which indicates its type. As stated above, one of the eight orthogonal code words may be assigned to each type of local link message "forward", "destination", "routing", and "receive". It should be noted that additional types can be defined by using a larger code word. An all zero code word can be used to indicate that this frame is a regular frame, i.e., a frame that does not require processing by the message processor 260.

The header 401 also contains control information 403, which is specific to each type of message. The routing message header will contain: the node ID of the mobile station that is nominating itself as a major node, the amount of bandwidth available at the node and a vector measurement that may include the position, speed, and bearing of the node.

A destination header contains the following control information: the node ID of the minor node that is responding to the routing message, and the node ID of the major node. The forward header contains a list of major nodes that will forward the frame, as well as a list of destinations. Note that a destination list size of more than one indicates a multicast message. Finally, the receive message only requires that a list of destinations be present in the control portion of the header.

The size of the control portion 403 of the header 401 will depend on system level implementation details. These include such things as the length of node IDs. After the header is detected and the message processor determines the type of local link message, the individual fields in the control portion 403 of the header 401 will be known.

Security

By using PN codes and PN code phase offset values, only selected mobile nodes can access the data in the frames. The base station 110 can use additional encryption for routed messages to prevent the decoding of information in messages passing through the major node.

Also, to ensure continuity of the indirect link, an end of transmission signal can be used to indicate the end of routing messages. This can prevent the major node to be accidentally shut down while routing of messages is in progress.

The effect of the invention is to provide a locally linked mobile network within a mobile communications network. Nodes, i.e., radio transceivers, communicate directly with each other over the local links instead of via a base station as in the prior art. The locally linked network is adaptive, in that its client membership can change based on need, and there maybe overlaps between two or more local links. The link between members of a local link can be point-to-point, or point-to-multi-point. Each local link has a major node, which is defined as a mobile node that will direct or reroute data traffic between base station and other mobile nodes locally linked.

The benefit of such architecture is that it allows the continuation of communication services during periods when the client's terminal no longer has sufficient link quality to communicate directly with the base station. These situations typically occur during a hand-off event or more importantly due shadow fading or propagation effects that cause link quality to degrade for extended periods of time. Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A wireless mobile communications network including a base station and a plurality of mobile nodes, comprising:
    a first mobile node configured as a major node to communicate information directly with the base station via a network link; and
    a second mobile node configured as a minor node to communicate the information indirectly with the base station via a local link with the major node and the network link from the major node to the base station to form a locally linked mobile network within the wireless mobile communications network, wherein the communicating of the information is dynamically routed to optimize a quality of service of the wireless mobile communications network and the locally linked network; and
    wherein the base station includes a memory to store a configuration list to associate the major node with the minor node.

2. The wireless mobile communications network of claim 1 wherein each mobile node further comprises:
    a header detector, coupled to a receiver and a decoder, configured to detect a header in a frame used to communicate the information;
    a message processor, coupled to the header detector and a transmitter, configured to route the frame over the network link and the local link.

3. The wireless mobile communication network of claim 2 wherein the header detector is connected to an output of the decoder and the locally linked mobile network operates asynchronously.

4. The wireless mobile communication network of claim 2 wherein each mobile node further comprises a GPS receiver and the locally linked mobile network operates synchronously.

5. The wireless mobile communication network of claim 2 wherein the major node communicates the frame while in standby mode, and the minor node receives the frame in active mode.

6. The wireless mobile communications network of claim 2 wherein the mobile nodes are cellular telephones.

7. The wireless mobile communications network of claim 2 wherein each frame includes a header.

8. The wireless mobile communications network of claim 7 wherein the header includes a code word, and control information.

9. The wireless mobile communications network of claim 8 wherein the code word is a Walsh code word.

10. The wireless mobile communications network of claim 8 wherein the code word is a forward code word and the control information includes a list of a plurality of major nodes and a list of a plurality of minor nodes.

11. The wireless mobile communications network of claim 8 wherein the code word is a destination code word and the control information identifies the minor node and the major node.

12. The wireless mobile communications network of claim 8 wherein the code word is a routing code word and the control information identifies the major node and the control information indicates an amount of available bandwidth.

13. The wireless mobile communications network of claim 8 wherein the code word is a receive code word.

14. The wireless mobile communications network of claim 2 wherein the message processor of the major node replaces a forward code word in a header of the frame with a receive code word, the forward code word identifying the major node and the receive code word identifying the minor node.

15. The wireless mobile communications network of claim 1 wherein the base station monitors bandwidth of the locally linked mobile network.

16. The wireless mobile communications network of claim 1 wherein a configuration list of the nodes of the locally linked mobile network is adaptively adjusted by the base station depending on need, traffic type, link quality, coverage, utilized bandwidth, and mobility.

17. The wireless mobile communications network of claim 1 wherein each mobile node monitors a quality of the network link with the base station.

18. The wireless mobile communication network of claim 4 wherein the GPS receiver estimates position, speed, and bearing of the mobile node.

19. The wireless mobile communication network of claim 4 wherein each mobile node uses channel quality and mobility characteristics to determine suitability for operating as the major node.

20. The wireless mobile communication network of claim 1 wherein the locally linked mobile network includes a plurality of major nodes configured to communicate information with each other and the minor node.

21. The wireless mobile communication network of claim 1, wherein the minor node is associated with a plurality of major nodes.

22. The wireless mobile communications network of claim 1 wherein the locally linked mobile network operates in multicast mode.

23. The wireless mobile communications network of claim 2 wherein each frame is encrypted using a pseudo random number sequence.

24. The wireless mobile communication network of claim 1 wherein the major node operates in active mode while receiving low bandwidth frames intended for the major node, and high bandwidth frames intended for the minor node.

25. The wireless mobile communications network of claim 1 including a plurality of major nodes and the base station selects a particular one of the plurality of major nodes to communicate with the minor node based on available bandwidth between the major node and the base station.

26. The wireless mobile communications network of claim 1 including a plurality of base stations and a plurality of major nodes and minor nodes communicating with each other via network links and local links.

27. The wireless mobile communications network of claim 26 wherein a first major node communicates with a first base station and a first minor node, and a second major node communicates with a second base station and a second minor node to enable the first and second minor nodes to communicate indirectly with each other via the first and second major nodes and the first and second base stations.

28. The wireless mobile communications network of claim 26 wherein minor nodes are dynamically assigned to different major nodes depending on a quality of service of the network link and the local link.

29. The wireless mobile communications network of claim 1 further including an end of transmission signal to indicate an end of communicating the information.

30. A method for communicating information in a wireless mobile communications network including a base station and a plurality of mobile nodes, comprising:
   communicating information directly between a first mobile node configured as a major node and the base station via a network link; and
   communicating the information indirectly between the base station and a second mobile node configured as a minor node via the network link between the base station and the major node and a local link between the major node and the minor node, wherein the communicating of the information is dynamically routed to optimize a quality of service of the wireless mobile communications network and the locally linked network; and
   wherein the base station includes a memory to store a configuration list to associate the major node with the minor node.

31. The method of claim 30 further comprising:
   detecting a header of a frame received in the major node; and
   routing the frame to the minor node via a message processor of the major node.

* * * * *